United States Patent
Diekmeyer et al.

(10) Patent No.: US 9,951,897 B2
(45) Date of Patent: Apr. 24, 2018

(54) ELASTIC SEAL ELEMENT FOR A FLUID PASSAGE

(71) Applicant: WABCO GmbH, Hannover (DE)

(72) Inventors: Heinrich Diekmeyer, Barsinghausen (DE); Yves Hansen, Hannover (DE); Joachim Hein, Hannover (DE); Dirk Hillbring, Celle (DE); Hauke Kraus, Hannover (DE)

(73) Assignee: WABCO GmbH, Hannover (DE)

( * ) Notice: Subject to any disclaimer, the term of this patent is extended or adjusted under 35 U.S.C. 154(b) by 374 days.

(21) Appl. No.: 14/649,377

(22) PCT Filed: Oct. 31, 2013

(86) PCT No.: PCT/EP2013/003285
§ 371 (c)(1),
(2) Date: Jun. 3, 2015

(87) PCT Pub. No.: WO2014/086451
PCT Pub. Date: Jun. 12, 2014

(65) Prior Publication Data
US 2015/0345675 A1 Dec. 3, 2015

(30) Foreign Application Priority Data

Dec. 7, 2012 (DE) .................. 10 2012 023 972

(51) Int. Cl.
*F16L 17/00* (2006.01)
*F16L 21/00* (2006.01)
(Continued)

(52) U.S. Cl.
CPC .......... *F16L 21/005* (2013.01); *B60T 17/043* (2013.01); *F16J 15/022* (2013.01); *F16J 15/025* (2013.01); *F16L 25/00* (2013.01); *F16L 27/107* (2013.01)

(58) Field of Classification Search
CPC ....... F16L 21/005; F16L 25/00; F16L 27/107; F16J 15/022; F16J 15/025; B60T 17/043
(Continued)

(56) References Cited

U.S. PATENT DOCUMENTS 2,738,993 A * 3/1956 Wilson .................. F16L 21/005
 285/235
2,898,000 A * 8/1959 Hanny ................. F16J 15/0887
 285/918

(Continued)

FOREIGN PATENT DOCUMENTS

DE 10 2009 054 524 A1 6/2011

*Primary Examiner* — Gregory J Binda
(74) *Attorney, Agent, or Firm* — Warner Norcross & Judd LLP

(57) ABSTRACT

An elastic seal element seals a fluid passage between a first component and a second component from the surroundings, the fluid passage passing through the seal element. The seal element has a first bead, which provides a sealing line to sealingly contact the first component around the fluid passage. The seal element further has a second bead, which provides a second sealing line to sealingly contact the second component around the fluid passage. The seal element has a tubular shape, a tubular casing extending between the first bead at the first end of the seal element and the second bead at the second end of the seal element, wherein the tubular casing allows a transversal offset of the second bead relative to the first bead to seal the fluid passage by the seal element even when the second component is offset transversely relative to the first component.

15 Claims, 3 Drawing Sheets

(51) Int. Cl.
    *F16J 15/02*     (2006.01)
    *F16L 25/00*     (2006.01)
    *F16L 27/107*     (2006.01)
    *B60T 17/04*     (2006.01)

(58) Field of Classification Search
    USPC ............... 285/370, 918; 277/315, 607, 634
    See application file for complete search history.

(56) References Cited

U.S. PATENT DOCUMENTS

| | | | |
|---|---|---|---|
| 4,407,516 A | 10/1983 | Le et al. | |
| 4,831,957 A * | 5/1989 | Goans | G01L 19/12 |
| | | | 116/266 |
| 5,096,332 A * | 3/1992 | Kawafuji | F16L 55/163 |
| | | | 405/157 |
| 5,716,158 A | 2/1998 | Hahn et al. | |

* cited by examiner

ELASTIC SEAL ELEMENT FOR A FLUID PASSAGE

FIELD OF THE INVENTION

The present invention generally relates to an elastic seal element for sealing off a fluid passage from the surroundings, wherein the fluid passage extends between a first component and a second component and passes through the seal element.

BACKGROUND OF THE INVENTION

A known elastic seal element of the general type under consideration is, for example, a sealing ring, or what is referred to as an O-ring. By way of an O-ring, a fluid passage, for example a pneumatic or hydraulic connection, between a first component and a second component can be sealed off in that axial sealing lines of the O-ring are pressed against the first component and the second component such that the O-ring is clamped in between the first component and the second component with the exertion of axial forces, which have to be applied by high mounting forces during mounting. However, the high mounting forces make mounting difficult. Furthermore, the axial forces can influence the measurement signal of a pressure measuring cell when the pressure measuring cell is mounted as a second component, clamped by the O-ring, on the first component, for example a housing. These disadvantages can correspondingly affect a fluid-conducting device, a compressed air system and a motor vehicle in which the elastic seal element can be utilized, and also the use of the elastic seal element for sealing off a fluid passage, when this elastic seal element is a conventional O-ring.

SUMMARY OF THE INVENTION

Generally speaking, it is an object of the present invention to improve the sealing-off of a fluid passage between a first component and a second component.

In accordance with various embodiments of the present invention, an elastic seal element is provided for sealing off a fluid passage from the surroundings, wherein the fluid passage extends between the first component and the second component and passes through the seal element. The elastic seal element has a first sealing line, in order to make sealing contact with the first component all around the fluid passage. This first sealing line is provided by a first bead of the elastic seal element. The elastic seal element also has a second sealing line, in order to make sealing contact with the second component all around the fluid passage. In this way, a fluid connection between the first component and the second component, the fluid connection being sealed off from the surroundings, is provided by means of the elastic seal element.

A fluid-conducting device is also provided, which has the first component, the second component and the elastic seal element. Furthermore, a compressed air system for a motor vehicle is provided, which has the inventive seal element and/or fluid-conducting device. Further still, a motor vehicle is provided, which has the elastic seal element, the fluid-conducting device or the compressed air system.

In accordance with an embodiment of the present invention, the elastic seal element has a tubular configuration, wherein the first bead is arranged at the first end of the seal element. The second sealing line is provided by a second bead, which is arranged at the second end of the seal element. A tubular sheath extends from the first bead to the second bead. This tubular sheath allows an eccentric arrangement, or a transverse offset, of the second bead relative to the first bead, in order to seal off the fluid passage by means of the seal element even in the case of an eccentric or transversely offset orientation of the second component relative to the first component. The fluid conducted in the fluid connection is preferably compressed air. Alternatively, the fluid is, for example, a hydraulic oil or some other hydraulic fluid. The fluid connection can thus be a pneumatic or hydraulic connection.

The inventive elastic seal element permits flexible compensation of a tolerance-related offset of the first component and of the second component or of holes for the fluid passage in the components relative to one another. The first component and the second component can be constructed and assembled with greater manufacturing tolerances and thus in a more cost-effective manner. Furthermore, necessary mounting forces are reduced. As a result, mounting is simplified as a whole. Compared with alternative solutions, the material complexity is additionally reduced with the elastic seal element.

The elastic seal element can thus be used flexibly given a transversely offset orientation of the first component and of the second component relative to one another. The transverse offset can be compensated flexibly. By way of a positive pressure in the fluid passage with respect to the surroundings, the correspondingly mounted elastic seal element can be applied flexibly to internal contours of the first component and of the second component.

According to an embodiment, the first sealing line is configured as a radial sealing line or the second sealing line is configured as a radial sealing line. Preferably, both sealing lines are configured as radial sealing lines. As a result, the mounting forces and the forces that act on the first component and second component can be significantly reduced.

According to an embodiment, the first bead is configured as a radial seal for exclusively radial sealing. The first sealing line is, in this case, the only sealing line of the first bead. Alternatively or in addition, the second bead is configured as a radial seal for exclusively radial sealing. In this case, the second sealing line is the only sealing line of the second bead. Thus, radial and axial sealing lines are not provided at the same time on the first bead and the second bead, respectively. A configuration of a bead as a radial seal having a single sealing line has advantages both in terms of easier mounting and in terms of improved tightness compared with a bead having a seal that acts in some other way or has a number of sealing lines.

According to an embodiment, the first bead has at least one first axial groove, which, in order to avoid an axial sealing line, breaks through the axial rim of the first bead in the radial direction. Alternatively or in addition, the second bead preferably has at least one second axial groove, which, in order to avoid an axial sealing line, breaks through the axial rim of the second bead in the radial direction. Preferably, the first bead has exactly four first axial grooves and/or the second bead has exactly four second axial grooves. The elastic seal element is easy to mount and, following mounting, has an advantageous seat when the axial rim of the first bead and of the second bead, respectively, makes contact with the first component and the second component, respectively. Furthermore, axial sealing lines should advantageously be avoided for the reasons already mentioned above and these axial sealing lines can be avoided advantageously by means of axial grooves, which break through the axial rims in the radial direction. In particular, on account of the axial grooves, no air chambers with undefinable pressures are formed between the first bead and the first component and between the second bead and the second component, respectively, which air chambers, in particular in the event of fluctuating pressures in the fluid passage, could negatively affect the sealing-off of the fluid passage at the first sealing line or second sealing line, respectively.

According to an embodiment, the circumference of the tubular sheath is less than the circumference of the first bead and/or less than the circumference of the second bead in its central portion at least in the case of pressure equalization between the fluid passage and the surroundings. In particular, the tubular sheath has a uniform circumference and thus forms a straight connection of the two beads, the thickness of which is preferably greater than the wall thickness of the tubular sheath. In this case, the beads are substantially convex bulges that transition, at least at the outer side of the elastic seal element, into the tubular sheath via concavely curved portions, at least when there is pressure equalization or when the elastic seal element is not yet sealing off the fluid passage between the first component and the second component with a positive pressure in the fluid passage. The thickness of the beads is preferably greater than the wall thickness of the tubular sheath.

The smaller circumference of the tubular sheath with respect to the beads in the case of pressure equalization allows easy mounting of the elastic seal element or of the first and the second component relative to one another, with the fluid passage being sealed off by means of the elastic seal element. In addition, any transverse offset between the first hole and the second hole and thus between the first bead and the second bead is compensated effectively by means of the tubular sheath.

According to an embodiment, the circumference of the tubular sheath is configured to be enlargeable with respect to the surroundings, at least in its central portion, by positive pressure in the fluid passage, in order to apply the seal element flexibly to the first component and to the second component. However, with a suitably large positive pressure, the tubular sheath expands, in particular in the central portion, and is thus applied to contours of the first component and of the second component. For this purpose, the tubular sheath is configured in a particularly flexible manner. Alternatively or in addition, for this purpose, the wall thickness of the tubular sheath is configured to be smaller than the thickness of the beads. In this case, the convex curvature of the beads transitions, preferably at the inner side of the elastic seal element, into the tubular sheath via concavely curved portions when the tubular sheath has been expanded on account of a positive pressure in the interior of the elastic seal element.

In particular, with the tubular sheath expanded, contact is made with internal walls of the first hole in the first component and of the second hole in the second component by means of the first bead and by means of the second bead, respectively, and by means of, in each case, a part of the tubular sheath. The clear inside diameter or cross section of the elastic seal element is, in this case, sufficiently enlarged, so as to allow effective pressure transfer or transmission of pressure medium such as compressed air or hydraulic fluid between the first component and the second component even in the case of a transverse offset.

Advantageously, the elastic seal element includes an elastomer, in particular silicone. Preferably, the seal element consists substantially of the elastomer, in particular silicone. In this way, the seal element is cost-effective to produce and particularly suitable for sealing off the fluid passage.

Advantageously, merely a small gap between the first component and the second component has to be bridged and sealed off. The elastic seal element projects not much further than necessary into the holes in the components. Therefore, the length of the elastic seal element in the axial direction is less than the circumference of the first bead and/or less than the circumference of the second bead.

The transverse offset, allowed by means of the elastic seal element, between the beads or between the holes in the first component and in the second component relative to one another is advantageously between 0 and at least 5%, in particular between 0 and at least 10%, of the circumference of the first bead and/or of the circumference of the second bead. The elastic seal element can therefore be used to seal off the fluid passage between components with correspondingly large manufacturing tolerances.

In a fluid-conducting device according to an embodiment of the present invention, having the first component and the second component, the seal element is configured to seal off the fluid passage in the manner described herein. Advantageously, the first component is a housing in this case. The second component is advantageously a measuring cell, in particular a pressure sensor. Thus, a measuring cell can be fastened to a housing and measure a pressure supplied to the measuring cell from the housing via the fluid passage. In this case, the measuring cell is arranged, for example, in the housing itself or in a cover of the housing and is pressed onto the housing via the cover or fixed to the housing, respectively. By virtue of the inventive elastic seal element, the cover only has to press the measuring cell against the housing with comparatively small forces, so as not only to make it easier to mount the cover on the housing but also to minimize the risk of the measurement being influenced on account of only small forces acting on the measuring cell.

According to an embodiment, the first component includes plastic material, at least in the region with which the seal element makes contact. In particular, the first component consists entirely or substantially of plastic material. Alternatively, the first component includes aluminum or consists entirely or substantially of aluminum.

Alternatively or in addition, the second component includes ceramic, at least in the region with which the seal element makes contact. In particular, the second component consists entirely or substantially of ceramic, at least in the region with which the seal element makes contact. For example, the measuring cell or the pressure sensor has a body made of ceramic or is a ceramic measuring cell.

In alternative embodiments of the invention, the first component and/or the second component consist(s) of other materials or includes other materials, in particular in the respective region with which the seal element makes contact. Examples of such other materials are further metals and materials that are not sensitive to temperatures or temperature fluctuations in the area of application of the fluid-conducting device.

According to an embodiment, not only can components with higher manufacturing tolerances be used, but also components having corresponding manufacturing tolerances. The second component is thus arranged with a transverse offset relative to the first component with respect to contact faces of the first component and of the second component with the seal element. In particular, the above-mentioned second hole is arranged in an offset manner relative to the first hole when the first component and the second component are arranged with the elastic seal element in order to form the fluid-conducting device.

According to an embodiment, the second component is fixed relative to the first component. In particular, for example, no rotation of the second component relative to the first component takes place. The first component and/or the second component thus do not have to rub against the elastic seal element, this having a positive effect on the preservation of the seal properties.

According to the present invention, a compressed air system is provided for a motor vehicle and has the inventive elastic seal element or the inventive fluid-conducting device having the elastic seal element. The compressed air system is, for example, a pneumatic brake system of the motor vehicle, wherein the fluid-conducting device is, for example, a brake modulator having a housing in which valves are arranged. By means of the measuring cell, for example, an input pressure or a modulated pneumatic pressure is measured. Alternatively or in addition, the compressed air system can comprise an air suspension, wherein the fluid-conducting device or the elastic seal element can be part of the air suspension.

According to the present invention, a motor vehicle, in particular a commercial vehicle, for example a truck or a bus includes the inventive elastic seal element or the inventive fluid-conducting device or the inventive compressed air system. The motor vehicle can otherwise be configured in a known manner, for example be driven by an engine, in particular an internal combustion engine, and have wheels and optionally a loading surface.

According to an embodiment, the elastic seal element and the second component are arranged at the first component such that subsequently the fluid passage passes through the seal element between the first component and the second component, wherein the seal element makes sealing contact with the second component in an eccentric manner or in a manner transversely offset relative to the first component such that the first sealing line of the seal element, the first sealing line being provided by the first bead of the seal element, is brought into sealing contact with the first component all around the fluid passage and the second sealing line of the seal element, the second sealing line being provided by the second bead of the seal element, is brought into sealing contact with the second component all around the fluid passage. In this case, the seal element is arranged preferably with a transverse offset of the second bead relative to the first bead, wherein the transverse offset is enabled by means of the tubular sheath of the seal element configured in a tubular manner, the tubular sheath extending from the first bead, arranged at the first end of the seal element, to the second bead, arranged at the second end of the seal element. Thus, the seal element is used for sealing off with flexible tolerance compensation.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The present invention is discussed in greater detail below on the basis of exemplary embodiments illustrated in the accompanying drawings, in which.

LIST OF REFERENCE SYMBOLS

Figure 2:
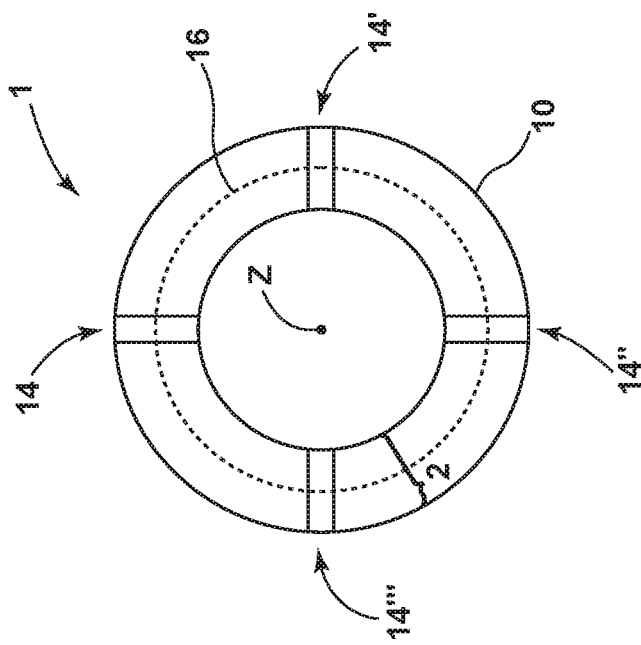
FIG. 2 shows a plan view of the elastic seal element of the exemplary embodiment according to FIG. 1 all around a fluid passage.

1 Elastic seal element
2 First bead
6 Second bead
7 First end
8 Second end
10 First sealing line
12 Second sealing line
14,14',14";14''' First axial groove
16 Axial rim of the first bead
18, 18',18";18''' Second axial groove
20 Axial rim of the second bead
22 Tubular sheath
24 Fluid-conducting device
26 First component
28 Second component
30 First pressure channel
32 First hole
34 Second pressure channel
36 Second hole
38 Fluid passage
40 Fluid gap
42 Fluid chamber (first)
44 Fluid chamber (second)
Z Axis
M Central portion of the tubular sheath
Q Transverse offset

DETAILED DESCRIPTION OF THE PREFERRED EMBODIMENTS

Figure 1:
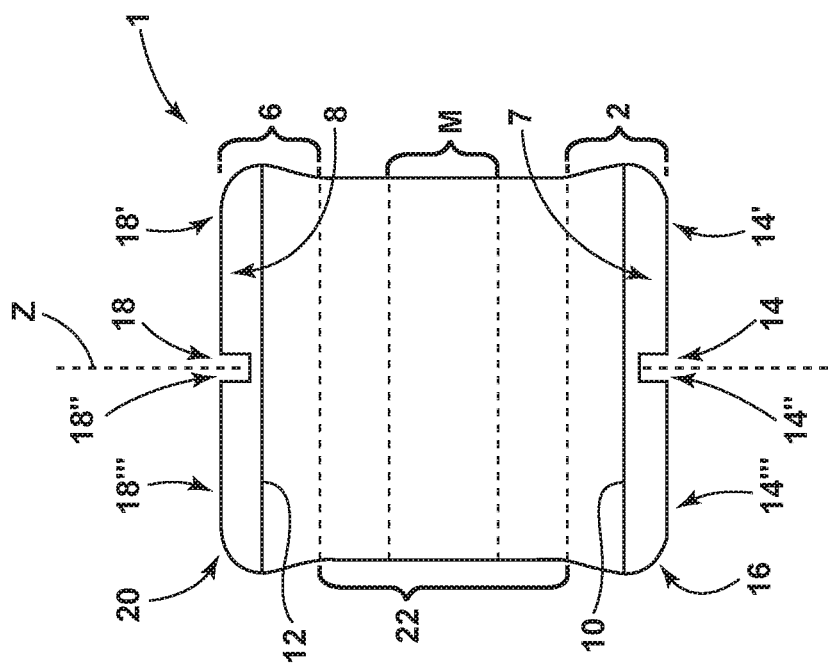
FIG. 1 shows a side view of an elastic seal element according to an exemplary embodiment of the present invention.

FIG. 1 and FIG. 2 show an elastic seal element 1 according to an exemplary embodiment of the present invention. FIG. 1 shows a side view of the seal element 1 and FIG. 2 shows a plan view thereof. The elastic seal element 1 is a tubular seal having beads 2 and 6. The elastic seal element 1 is configured in a symmetrical manner with regard to rotations through 90 degrees, through 180 degrees and through 270 degrees about an axis Z. Between the beads 2, 6, and in an embodiment without grooves, deviating from the exemplary embodiment according to FIG. 1, the elastic seal element 1 is even configured in a rotationally symmetrical manner about the axis Z at the beads 2, 6.

The elastic seal element 1 has the first bead 2 at its first end 7 and the second bead 6 at its second end 8. The first bead 2 and the second bead 6 are each configured as a radial seal for exclusively radial sealing. To this end, the first bead 2 has a first sealing line 10, configured as a radial sealing line, and the second bead 6 has a second sealing line 12, configured as a radial sealing line. The first sealing line 10 is the only sealing line of the first bead 2. In order to avoid an axial sealing line, the first bead 2 has four first axial grooves 14, 14', 14", 14''', which break through the axial rim 16 of the first bead 2 in the radial direction, i.e., perpendicularly to the axis Z. In a corresponding manner, the second bead 6 has four second axial grooves 18, 18', 18", 18''', which break through the axial rim 20 of the second bead 6 in the radial direction.

Between the first bead 2 and the second bead 6, the elastic seal element 1 is configured as a tubular sheath 22, which has a smaller circumference than the first bead 2 and than the second bead 6, at least in a central portion M. The elastic seal element 1 having the first bead 2, the second bead 6 and the tubular sheath 22 is, in this case, configured in one piece and consists substantially of silicone or some other elastomer.

Figure 3:
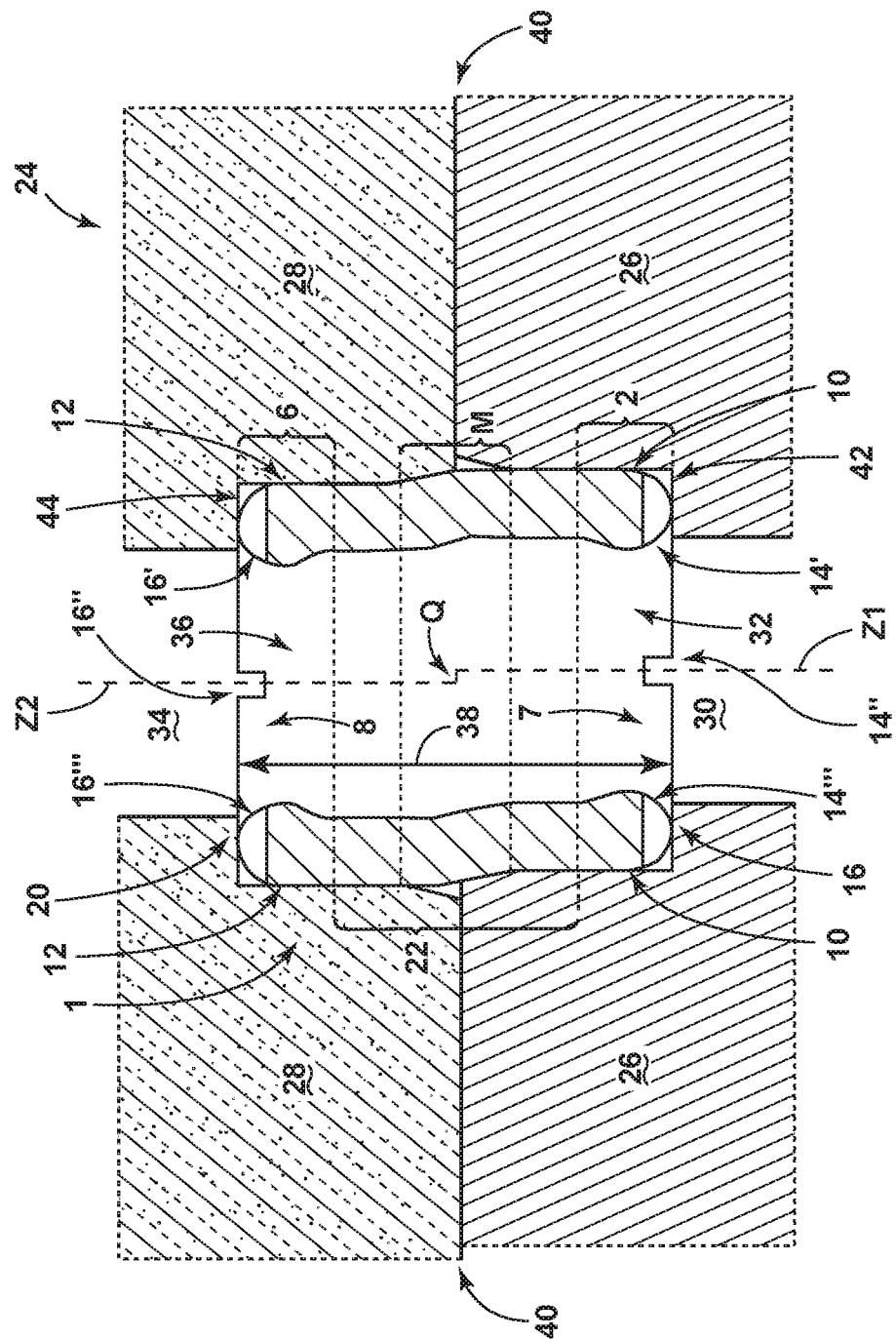
FIG. 3 shows a sectional illustration from the side of a fluid-conducting device having the elastic seal element of the exemplary embodiment according to FIGS. 1 and 2.
Figure 4:
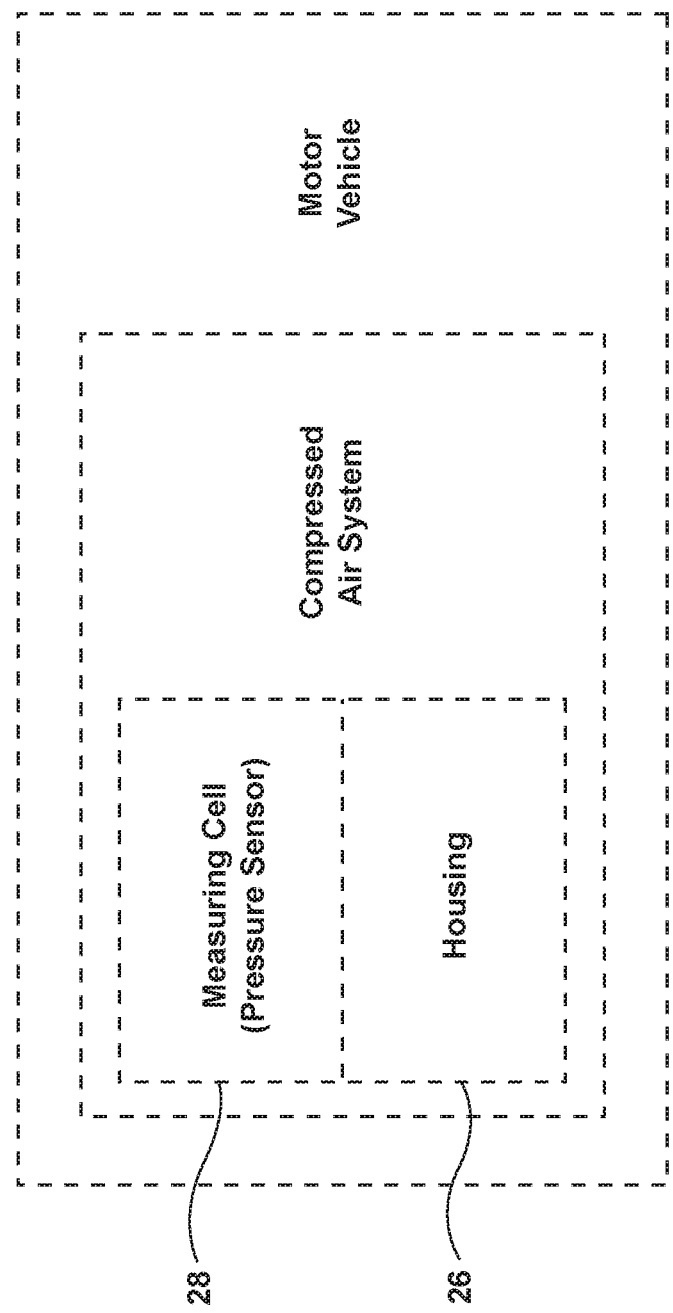
FIG. 4 shows a motor vehicle including a compressed air system having a measuring cell and a housing.

FIG. 3 shows a sectional illustration from the side of a fluid-conducting device 24 according to an exemplary embodiment of the present invention. The fluid-conducting device 24 has a first component 26, for example a plastic housing or an aluminum housing. Furthermore, the fluid-conducting device 24 has a second component 28, for example a ceramic measuring cell, and the elastic seal element 1 of the exemplary embodiment according to FIGS. 1 and 2. A first pressure channel 30 in the first component 26 widens toward the rim of the first component 26 to form a hole 32. A second pressure channel 34 in the second component 28 widens toward the rim of the second component 28 to form a second hole 36. A fluid passage 38 from the first component 26 to the second component 28 extends in the region of or within the holes 32 and 36, crossing a possible fluid gap 40 between the first component 26 and the second component 28.

The fluid passage 38 passes through the elastic seal element 1 and is sealed off from the surroundings by means of the elastic seal element 1. In particular, the elastic seal element 1 prevents compressed air from flowing out of the first pressure channel 30 and out of the second pressure channel 34, or out of the fluid passage 38 through the fluid gap 40, to the surroundings. By means of the first sealing line 10, the first component 26 is brought into sealing contact all around the fluid passage 38. By means of the second sealing line 12, the second component 28 is brought into sealing contact all around the fluid passage 38. The grooves 14, 14', 14" and 14''' and 18, 18', 18" and 18''', respectively, allow a fluid exchange or air exchange between the fluid passage 38 and chambers 42 and 44, such that axial sealing lines are avoided and the radial sealing lines 10 and 12 are thus supported in their function, or not impaired.

In the illustration according to FIG. 3, the tubular sheath 22 is widened with respect to the surroundings, in particular in its central portion M, on account of a positive pressure in the fluid passage 38, such that the tubular sheath 22 molds itself to internal contours of the first component 26 and of the second component 28, in particular to internal contours of the holes 32 and 36. This takes place on account of the flexible configuration of the elastic seal element 1, or of the tubular sheath 22, in spite of a transverse offset Q between the first component 26 and the second component 28, or between the first bead 2 and the second bead 6, or between the first hole 32 and the second hole 36. Rather than the continuous axis Z, the elastic seal element 1 now has two axes Z1 and Z2 that are offset with respect to one another by the transverse offset Q. In particular, in the central portion M, the rotational symmetry according to FIG. 1 is at least no longer present in a continuous manner on account of the contour adaptation.

Overall, the inventive embodiments allow flexible mounting in the case of components 26, 28 that have manufacturing tolerances or are oriented in an offset manner with respect to one another. The elastic seal element 1 can flexibly compensate tolerances of components 26, 28, or holes 32, 36, that are not oriented exactly with one another, wherein, in particular, in the region of the tubular sheath 22, the elastic seal element 1 is applied flexibly to the internal contour of the components 26 and 28, in particular, in the region of the holes 32 and 36.

Thus, the invention allows easy mounting by way of the elastic seal element 1 that is cost-effective to produce, and thus a reduction in part costs and assembly costs.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. An elastic seal for sealing off a fluid passage between a first component and a second component, the seal comprising:
   a first bead providing a first sealing line to make sealing contact with the first component around the fluid passage;
   a second bead providing a second sealing line to make sealing contact with the second component around the fluid passage; and
   a tubular sheath extending from the first bead to the second bead, the tubular sheath being configured to allow a transverse offset of the second bead relative to the first bead to seal off the fluid passage even when the second component is in a transversely offset orientation relative to the first component,
   wherein at least one of (i) the first bead has four axial grooves through an axial rim of the first bead in a radial direction, and (ii) the second bead has four axial grooves through an axial rim of the second bead in the radial direction.

2. The elastic seal as claimed in claim 1, wherein at least one of (i) the first sealing line is a radial sealing line and (ii) the second sealing line is a radial sealing line.

3. The elastic seal as claimed in claim 2, wherein at least one of (i) the first bead is a radial seal for exclusively radial sealing and the first sealing line is the only sealing line of the first bead, (ii) the second bead is a radial seal for exclusively radial sealing and the second sealing line is the only sealing line of the second bead.

4. The elastic seal as claimed in claim 1, wherein a circumference of the tubular sheath is at least one of less than a circumference of the first bead and less than a circumference of the second bead at least in a central portion when pressure equalization exists between the fluid passage and the surroundings.

5. The elastic seal as claimed in claim 1, wherein a circumference of the tubular sheath is enlargeable with respect to the surroundings, at least in a central portion, by positive pressure in the fluid passage for flexible application to the first component and to the second component.

6. A motor vehicle, comprising the elastic seal as claimed in claim 1.

7. A fluid-conducting device, comprising:
   a first component;
   a second component; and an elastic seal to seal off a fluid passage extending through the elastic seal between the first component and the second component, wherein the elastic seal has:
- a first bead providing a first sealing line, by which sealing contact is made with the first component around the fluid passage,
- a second bead providing a second sealing line, by which sealing contact is made with the second component around the fluid passage, and
- a tubular sheath extending from the first bead to the second bead, the tubular sheath being configured to allow a transverse offset of the second bead relative to the first bead to seal off the fluid passage even when the second component is in a transversely offset orientation relative to the first component,
- wherein at least one of (i) the first bead has four axial grooves through an axial rim of the first bead in a radial direction, and (ii) the second bead has four axial grooves through an axial rim of the second bead in the radial direction.

8. The fluid-conducting device as claimed in claim 7, wherein the first component is a housing and the second component is a measuring cell.

9. The fluid-conducting device as claimed in claim 8, wherein the measuring cell is a pressure sensor.

10. The fluid-conducting device as claimed in claim 7, wherein at least one of (i) the first component includes one of plastic material and aluminum at least in a contact region of the elastic seal, and (ii) the second component includes ceramic material at least in the contact region of the elastic seal.

11. The fluid-conducting device as claimed in claim 7, wherein the second component is arranged with the transverse offset relative to the first component with respect to contact faces of the first component and of the second component with the elastic seal.

12. The fluid-conducting device as claimed in claim 7, wherein the second component is fixed relative to the first component.

13. A compressed air system for a motor vehicle, comprising:
an elastic seal, the elastic seal being configured to seal off a fluid passage between a first component and a second component, the seal having:
- a first bead providing a first sealing line to make sealing contact with the first component around the fluid passage,
- a second bead providing a second sealing line to make sealing contact with the second component around the fluid passage, and
- a tubular sheath extending from the first bead to the second bead, the tubular sheath being configured to allow a transverse offset of the second bead relative to the first bead to seal off the fluid passage even when the second component is in a transversely offset orientation relative to the first component,
- wherein at least one of (i) the first bead has four axial grooves through an axial rim of the first bead in a radial direction, and (ii) the second bead has four axial grooves through an axial rim of the second bead in the radial direction.

14. A method for sealing off a fluid passage between a first component and a second component in one of a fluid-conducting device, a vehicle compressed air system, and a motor vehicle, the method comprising:
using an elastic seal comprising a first bead to provide a first sealing line to make sealing contact with the first component around the fluid passage, a second bead to provide a second sealing line to make sealing contact with the second component around the fluid passage, and a tubular sheath extending from the first bead to the second bead to allow a transverse offset of the second bead relative to the first bead to seal off the fluid passage even when the second component is in a transversely offset orientation relative to the first component,
wherein at least one of (i) the first bead has four axial grooves through an axial rim of the first bead in a radial direction, and (ii) the second bead has four axial grooves through an axial rim of the second bead in the radial direction.

15. The method as claimed in claim 14, further comprising:
arranging the elastic seal and the second component at the first component such that the fluid passage passes through the elastic seal between the first component and the second component, the elastic seal making sealing contact with the second component in a manner transversely offset relative to the first component such that the first sealing line of the elastic seal is brought into sealing contact with the first component around the fluid passage and the second sealing line of the elastic seal is brought into sealing contact with the second component around the fluid passage; and
arranging the elastic seal with the transverse offset of the second bead relative to the first bead via the tubular sheath extending from the first bead at a first end of the elastic seal to the second bead at a second end of the elastic seal.

* * * * *